United States Patent [19]
Ortiz

[11] Patent Number: 5,309,826
[45] Date of Patent: May 10, 1994

[54] TORTILLA TOASTER APPARATUS

[76] Inventor: Carlos R. Ortiz, P.O. Box 8135, Tyler Pk. Station, North Bergen, N.J. 07047

[21] Appl. No.: 88,382

[22] Filed: Jul. 9, 1993

[51] Int. Cl.$^5$ ............................................. A47J 37/08
[52] U.S. Cl. .................................. 99/391; 99/385; 99/393; 99/426; 99/448; 219/521
[58] Field of Search .......... 99/329 R, 329 P, 329 RT, 99/385, 388, 389–392, 393–396, 399–402, 410, 414, 426, 431, 428, 432, 448; 426/466, 520; 219/521, 531, 411, 410, 482

[56] References Cited

U.S. PATENT DOCUMENTS

| | | | |
|---|---|---|---|
| 951,287 | 3/1910 | Parkhurst | 99/385 |
| 2,165,204 | 7/1939 | Anderson | 99/391 X |
| 3,416,430 | 12/1968 | Hauser | 99/391 X |
| 3,866,525 | 2/1975 | Oxel | 99/385 |
| 3,941,044 | 3/1976 | Goltsos | 99/391 |
| 4,117,309 | 9/1978 | Cayley | 219/521 X |
| 4,346,651 | 8/1982 | Schickedanz | 219/521 X |
| 4,533,558 | 8/1985 | Ogle | 426/466 |
| 4,748,308 | 5/1988 | Drews | 99/393 X |
| 4,901,631 | 2/1990 | Russell et al. | 99/448 X |
| 5,156,637 | 10/1992 | Wai-Ching | 99/388 |

Primary Examiner—Timothy F. Simone
Attorney, Agent, or Firm—Leon Gilden

[57] ABSTRACT

A toaster housing is arranged to accommodate a plurality of tortilla type shells therewithin, wherein a top wall of the housing includes a row of alternatingly oriented U-shaped openings, with each of the openings aligned with an underlying U-shaped cage. A sineusoidal heating plate extends between ends of the housing about the cages to effect heating and toasting of the tortilla shells directed therewithin.

4 Claims, 4 Drawing Sheets

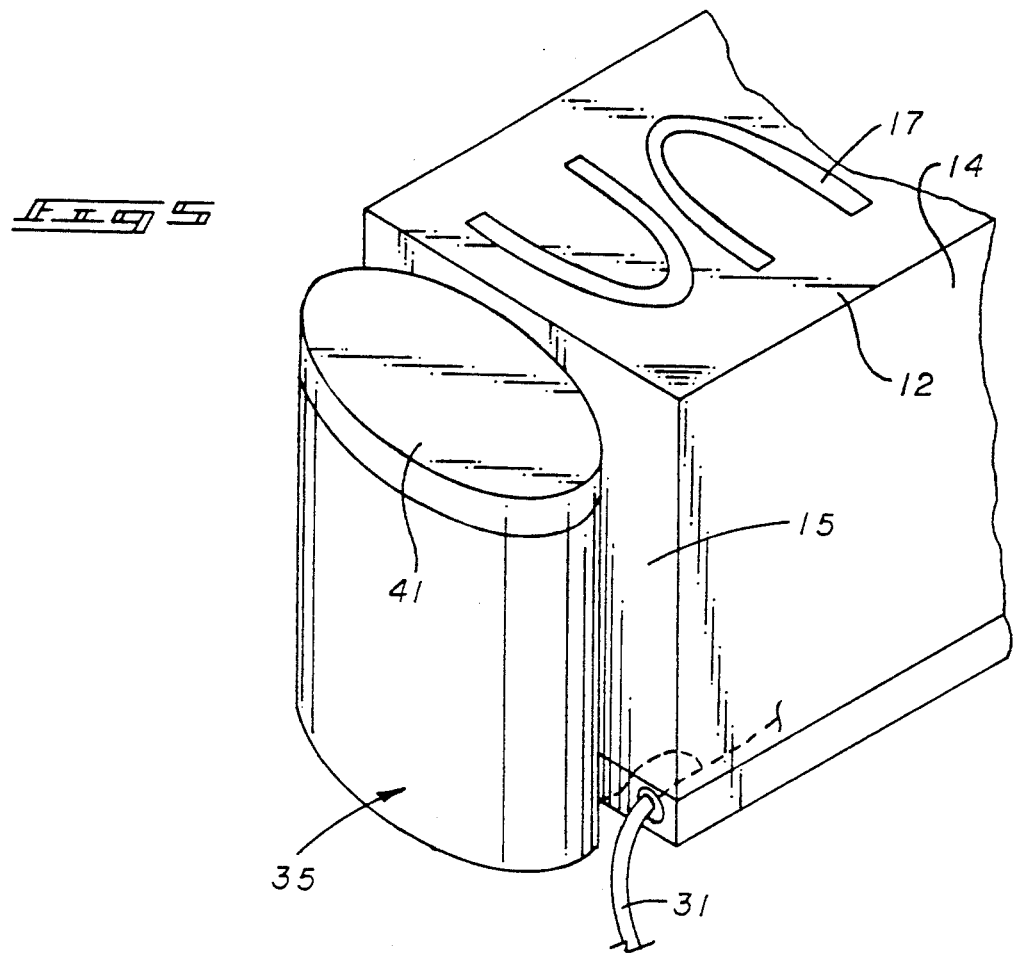
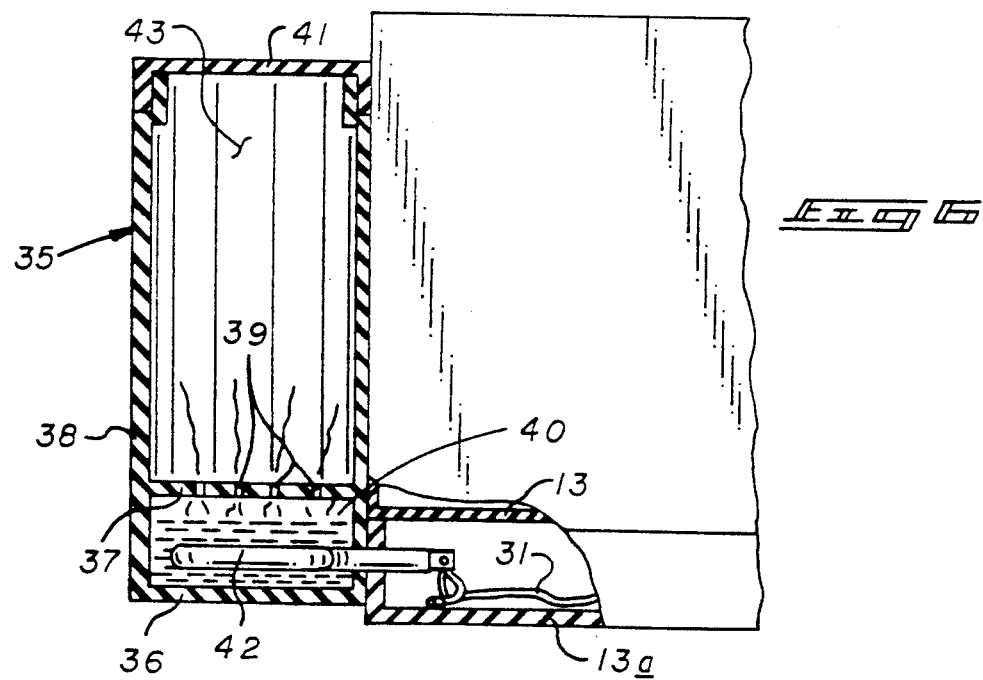

TORTILLA TOASTER APPARATUS

BACKGROUND OF THE INVENTION

1. Field of the Invention

The field of invention relates to toaster apparatus, and more particularly pertains to a new and improved tortilla toaster apparatus directed to the toasting of tortilla shells.

2. Description of the Prior Art

Toaster apparatus of various types have been utilized throughout the prior art, such as exemplified in U.S. Pat. No. 3,478,704 wherein an oven structure is arranged to bake tortilla type shell components.

The instant invention is directed to overcome deficiencies of the prior art by the compact and efficient utilization of space within a toaster housing to effect the toasting of tortilla members therewithin and in this respect, the present invention substantially fulfills this need.

SUMMARY OF THE INVENTION

In view of the foregoing disadvantages inherent in the known types of toaster apparatus now present in the prior art, the present invention provides a tortilla toaster apparatus wherein the same includes sineusoidal heating element structure mounted about spaced positioning cages within a toaster housing. As such, the general purpose of the present invention, which will be described subsequently in greater detail, is to provide a new and improved tortilla toaster apparatus which has all the advantages of the prior art toaster apparatus and none of the disadvantages.

To attain this, the present invention provides a toaster housing arranged to accommodate a plurality of tortilla type shells therewithin, wherein a top wall of the housing includes a row of alternatingly oriented U-shaped openings, with each of the openings aligned with an underlying U-shaped cage. A sineusoidal heating plate extends between ends of the housing about the cages to effect heating and toasting of the tortilla shells directed therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tortilla toaster apparatus which has all the advantages of the prior art toaster apparatus and none of the disadvantages.

It is another object of the present invention to provide a new and improved tortilla toaster apparatus which may be easily and efficiently manufactured and marketed.

It is a further object of the present invention to provide a new and improved tortilla toaster apparatus which is of a durable and reliable construction.

An even further object of the present invention is to provide a new and improved tortilla toaster apparatus which is susceptible of a low cost of manufacture with regard to both materials and labor, and which accordingly is then susceptible of low prices of sale to the consuming public, thereby making such tortilla toaster apparatus economically available to the buying public.

Still yet another object of the present invention is to provide a new and improved tortilla toaster apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of a steam housing employed by the invention.

FIG. 6 is an orthographic cross-sectional illustration of the steam housing as indicated in FIG. 5.

DESCRIPTION OF THE PREFERRED EMBODIMENT

Figure 1:
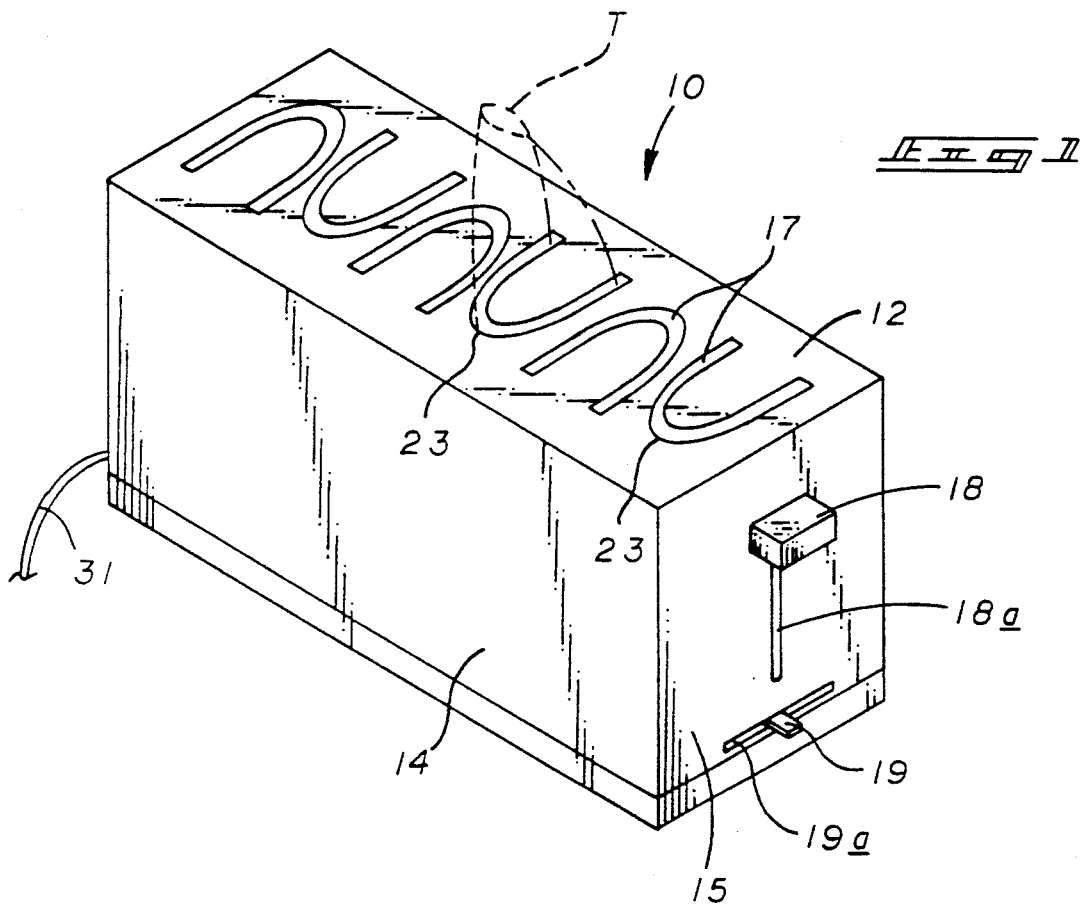
FIG. 1 is an isometric illustration of the invention.

With reference now to the drawings, and in particular to FIGS 1 to 8 thereof, a new and improved tortilla toaster apparatus embodying the principles and concepts of the present invention and generally designated by the reference numeral 10 will be described.

Figure 2:
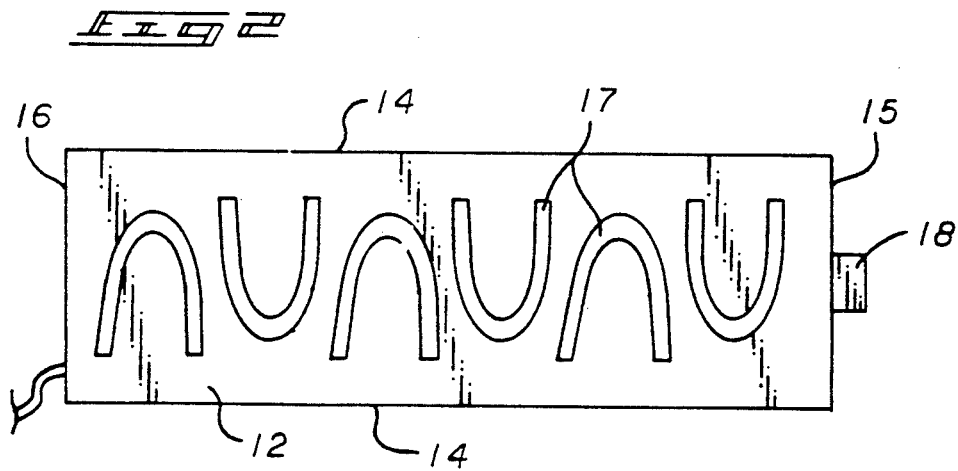
FIG. 2 is an orthographic top view of the invention.

More specifically, the tortilla toaster apparatus 10 of the instant invention essentially comprises a toaster housing 11, having a top wall 12 spaced from a first bottom wall 13, with spaced side walls 14 and a first side wall 15 spaced from a second end wall 16. The first end wall 15 includes a push bar 18 slidably received within a push bar slot 18a, wherein the push bar is in integral association with a push bar mounting flange 28 within the housing in adjacency to the first end wall 15. A row of U-shaped openings 17 are directed through the top wall 12, wherein each of the U-shaped openings 17 includes an apex 23 that is in an alternating facing relationship relative to one of the side walls 14 relative to adjacency of the U-shaped openings 17, in a manner as indicated in FIGS. 1 and 2. Further as indicated in the FIGS. 1 and 3, a temperature lever 19 is slidable within a temperature lever slot 19a through the first side wall 15.

Figure 3:
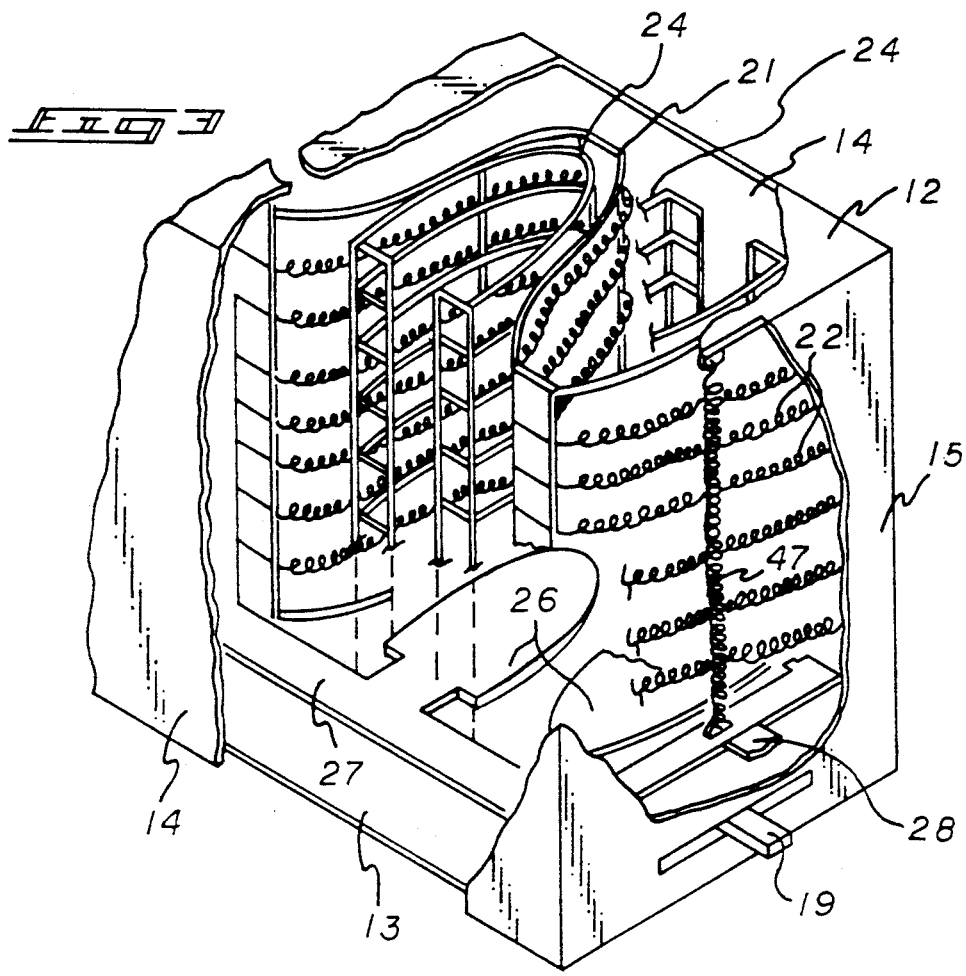
FIG. 3 is an isometric illustration of the invention indicating the positioning of the positioning cages within the sineusoidal heating structure in cooperation with the lift bars.

FIG. 3 indicates the use of a sineusoidal heating plate 21 extending from the first side wall 15 to the second side wall 16, with the heating plate 21 having a spaced row of vertically oriented heating elements 22 directed between the first floor 13 and the top wall 12. A row of U-shaped positioning cages 24 are received within the sineusoidal heating plate 21 between the first and second end walls 15 and 16, such that each of the positioning cages 24 is oriented below one of and aligned with one of the openings 17. Within each of the positioning cages 24 is a lift plate 26 fixedly mounted in a planar orientation relative to a rectilinear lift frame 27, that in turn is secured to the push bar mounting flange 28 and in turn is mechanically secured to the push bar 18 such that projection of the push bar 18 towards the first floor 13 directs the lift plates 26 in adjacency to the floor 13, such that subsequent to cycling, the tortilla shells "T" as indicated in FIG. 1 are directed through the slot 17 and lifted by the respective lift plates 26 of each of the positioning cages 24.

Figure 4:
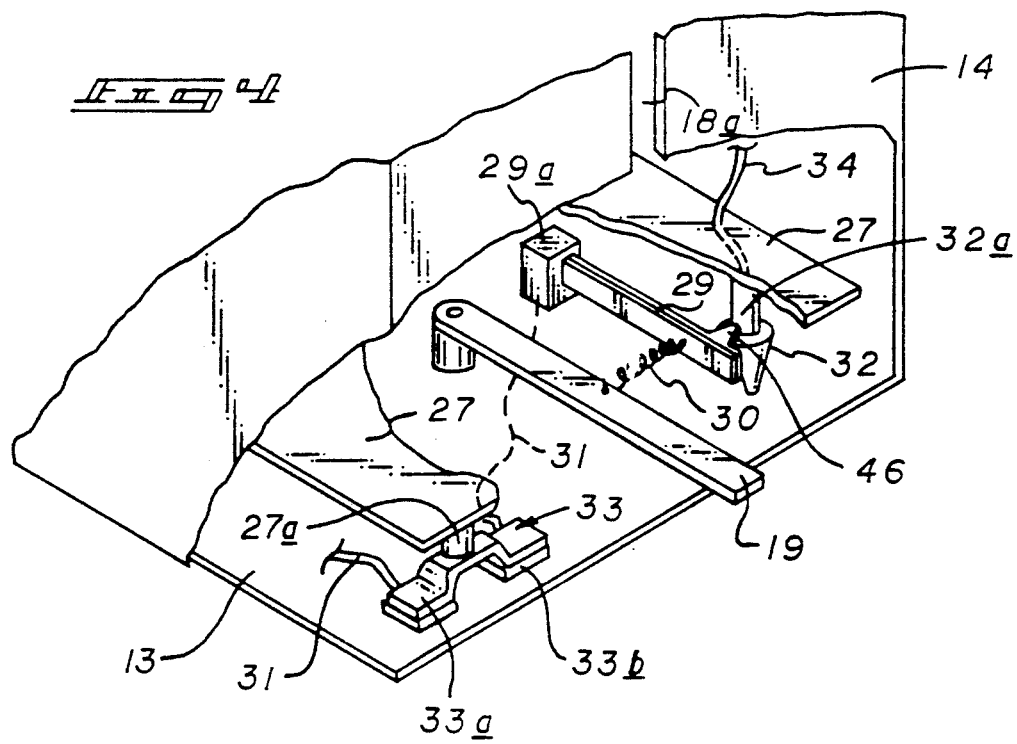
FIG. 4 is an isometric illustration, partially in section, of the heat control structure employed by the invention.

The FIG. 4 indicates the temperature lever 19, including a tension spring 30 mounted to a bi-metallic contact arm 29 that is secured to an arm hub 29a. The arm hub fixes the bi-metallic arm to the floor 13 and is arranged for providing tension communication of the bi-metallic arm 29 to a contact lug 32 that in turn includes a heating element connector line 34 directing electrical energy to the heating elements 22, whereupon heating of the bi-metallic arm 29 deflects the arm relative to the contact lug 32, whereupon selective tensioning by the tension spring 30 alters the time and heating within the cages 24. As illustrated, the rectilinear frame 27 when directed towards the first floor 13 effects communication with a switch 33 that delivers electrical energy continuously through the power supply 31 to the arm hub 29a permitting directing electrical energy to the heating elements 22. The switch 33 is operative by a first switch plate 33a mounted to the rectilinear frame 27 that communicates a second switch plate 33b when the rectilinear frame is directed towards the floor 13, as illustrated. The contact lug 32 is mounted to the rectilinear frame in an insulative manner by an insulative lug post 32a. The contact lug itself is of an inverted conical configuration, whereupon displacement of the contact arm 29, and more specifically the contact arm abutment lug 46 from the inverted conical contact lug 32, the lift frame 27 is free to be released in adjacency to the floor 13 by the lift frame spring structure 47. It should be further noted that the first switch plate is insulatively mounted relative to the lift frame 27 by a first switch plate insulative lug 27a, as illustrated in FIG. 4, to direct electrical current through the switch 33 into the electrical contact arm 29 that in turn directs such electrical current to the heating elements 22.

The FIGS. 5 and 6 indicate the use of an optional steam housing 35 mounted relative to the second end wall 16 such that the electrical power supply 31 includes a branch directed to the steam housing 35. The steam housing includes a steam housing bottom wall 36 spaced from a steam housing floor about the steam housing side wall 38. The steam housing floor 37 includes a plurality of floor apertures 39. A second bottom wall 13a receives the branch of the power supply 31 that directs electrical communication to a fluid chamber heating element 42 within a fluid chamber 40 between the steam housing floor 37 and the steam housing bottom wall 36. The steam housing floor apertures 39 directs steam into a steam chamber 43 oriented between the steam housing floor 37 and a housing lid 41. Replenishment of fluid within the fluid chamber 40 is accomplished by merely directing fluid onto the steam housing floor 37 and such fluid is received within the fluid chamber 40 through floor apertures 39. In this manner, tortilla shells may be positioned within the steam chamber 43 to permit their softening and enhanced ease of projection within the top wall opening 17.

Figure 7:
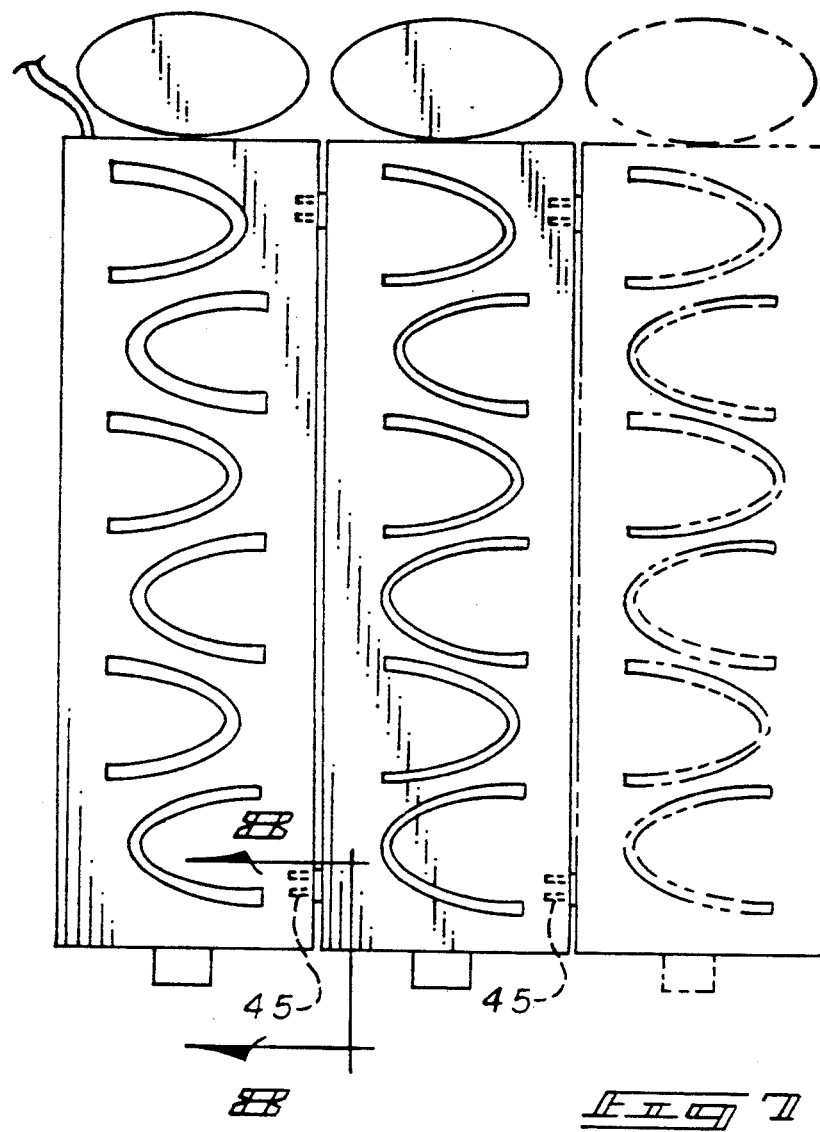
FIG. 7 is an orthographic top view of a plurality of toaster housings arranged a in ganged construction.
Figure 8:
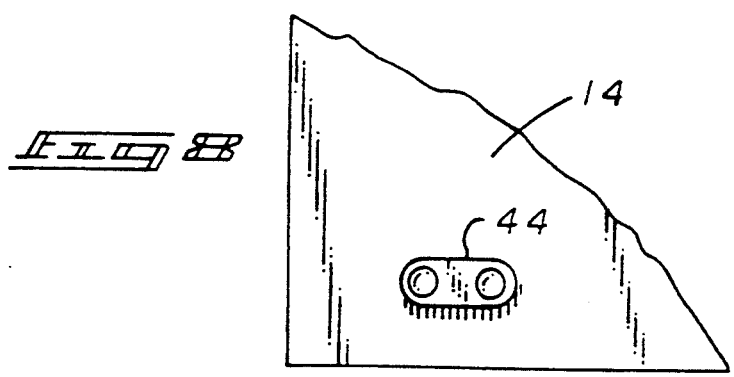
FIG. 8 is an orthographic view, taken along the lines 8—8 of FIG. 7 in the direction indicated by the arrows.

The FIGS. 7 and 8 indicates the use of ganged assembled toasters, wherein one of the side walls includes side wall sockets 44 cooperative with side wall plugs 45 of adjacent toaster structure to provide for ease of electrical intercommunication between a plurality of such toaster members.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A tortilla toaster apparatus, comprising,
a toaster housing having a top wall spaced from a bottom wall, and a plurality of spaced side walls, and a first end wall spaced from a second end wall, the first end wall includes a push bar slot having a push bar slidably received therethrough, and a temperature lever slot having a temperature lever directed slidably therethrough, and the toaster housing top wall includes a plurality of top wall U-shaped openings, each of the U-shaped openings includes an opening apex, and each apex positioned intermediate adjacent of said U-shaped openings is in an alternating orientation relative to said adjacent U-shaped openings, and a sineusoidal heating plate mounted within the toaster housing between the top wall and the bottom wall, and the sineusoidal heating plate includes a row of spaced heating elements oriented parallel relative to one another between the top wall and the bottom wall and extending from the first end wall to the second end wall along the sineusoidal heating plate, and a plurality of U-shaped positioning cages are fixedly mounted to the bottom wall and oriented within the sineusoidal heating plate, wherein each of the U-shaped positioning cages is positioned below and aligned relative to one of the U-shaped openings within the top wall, wherein each of the U-shaped positioning cages are arranged to receive a tortilla shell therewithin.

2. An apparatus as set forth in claim 1 including a rectilinear lift frame reciprocatably mounted within the toaster housing between the top wall and the bottom wall, wherein the lift frame includes a plurality of lift plates fixedly mounted in a coplanar orientation relative to the lift frame, wherein each of the lift plates is received within one of the positioning cages to effect lifting of the tortilla shells through the top wall openings, and wherein the lift frame includes a mounting flange, and the mounting flange is fixedly secured to the push bar.

3. An apparatus as set forth in claim 2 including an electrical power supply directed into the toaster housing, and the lift frame includes a first switch insulative lug, and the first switch insulative lug includes a first switch plate mounted to the first switch plate insulative lug between the lift frame and the bottom wall, and a second switch plate fixedly mounted to the bottom wall, with the electrical power supply directed to the second switch plate, whereupon projection of the lift frame to the bottom wall effects electrical communication between the first switch plate and the second switch plate, and a bi-metallic contact arm mounted to an insulative arm hub, wherein the insulative arm hub is fixedly secured to the bottom wall, and the bi-metallic contact arm including a contact arm abutment lug, and the lift frame further including a lift frame insulative lug post, wherein the insulative lug post includes an inverted conical contact lug, and the inverted conical contact lug is arranged to receive the contact arm abutment lug thereon, whereupon heating within the housing effects deflection of the bi-metallic contact arm to displace the contact arm abutment lug from the inverted conical contact lug, and the temperature lever includes a temperature lever spring mounted between the temperature lever and the bi-metallic contact arm to effect selective tensioning upon the bi-metallic contact arm to permit adjustment of tension upon the bi-metallic contact arm relative to the inverted conical contact lug.

4. An apparatus as set forth in claim 3 wherein the second end wall includes a steam housing, the steam housing including a steam housing bottom wall, and a steam housing floor spaced from the steam housing bottom wall, the steam housing floor including a plurality of floor apertures directed therethrough, the steam housing including a steam housing side wall, and a steam housing lid mounted to the steam housing side wall extending over the steam housing floor, and the toaster housing having a second bottom wall spaced from the bottom wall, wherein the electrical power supply is directed to a fluid chamber heating element, and a fluid chamber is oriented between the steam housing floor and the steam housing bottom wall, and wherein the fluid chamber heating element is positioned within the fluid chamber to effect heating of fluid positioned within the fluid chamber, and wherein a steam chamber is oriented between the steam housing floor and the steam housing lid to receive at least one tortilla shell to permit softening of the tortilla shell prior to insertion of said tortilla shell into the toaster housing.

* * * * *